United States Patent
Boehm

(10) Patent No.: US 7,027,584 B2
(45) Date of Patent: Apr. 11, 2006

(54) METHOD FOR SIGNALING AND PROCESSING INCOMING CALLS FOR A CALL CENTER

(75) Inventor: Markus Boehm, Munich (DE)

(73) Assignee: Siemens Aktiengellschaft, Munich (DE)

( * ) Notice: Subject to any disclaimer, the term of this patent is extended or adjusted under 35 U.S.C. 154(b) by 274 days.

(21) Appl. No.: 10/149,717

(22) PCT Filed: Dec. 12, 2000

(86) PCT No.: PCT/EP00/12607

§ 371 (c)(1),
(2), (4) Date: Oct. 15, 2002

(87) PCT Pub. No.: WO01/45372

PCT Pub. Date: Jun. 21, 2001

(65) Prior Publication Data

US 2003/0076942 A1   Apr. 24, 2003

(30) Foreign Application Priority Data

Dec. 17, 1999   (EP) .................................. 99125227

(51) Int. Cl.
*H04M 3/00* (2006.01)
(52) U.S. Cl. .............................. 379/265.09; 379/265.02
(58) Field of Classification Search ................ 370/352, 370/356; 379/265.02, 265.09, 900
See application file for complete search history.

(56) References Cited

U.S. PATENT DOCUMENTS

| | | | | |
|---|---|---|---|---|
| 5,937,051 A | * | 8/1999 | Hurd et al. ............. | 379/212.01 |
| 5,946,386 A | * | 8/1999 | Rogers et al. ......... | 379/265.09 |
| 6,130,933 A | * | 10/2000 | Miloslavsky ............. | 379/90.01 |
| 6,311,231 B1 | * | 10/2001 | Bateman et al. ........ | 379/265.09 |
| 6,373,836 B1 | * | 4/2002 | Deryugin et al. ........... | 370/352 |
| 6,381,329 B1 | * | 4/2002 | Uppaluru et al. ....... | 379/266.04 |
| 6,404,747 B1 | * | 6/2002 | Berry et al. ................. | 370/270 |
| 6,434,121 B1 | * | 8/2002 | Davidson et al. ........... | 370/270 |
| 6,438,599 B1 | * | 8/2002 | Chack ........................ | 709/229 |
| 6,493,447 B1 | * | 12/2002 | Goss et al. ............. | 379/265.09 |
| 6,507,647 B1 | * | 1/2003 | Mandalia ..................... | 379/219 |
| 6,560,329 B1 | * | 5/2003 | Draginich et al. ...... | 379/265.02 |
| 6,611,590 B1 | * | 8/2003 | Lu et al. ................. | 379/265.09 |
| 6,868,154 B1 | * | 3/2005 | Stuart et al. ............ | 379/265.06 |

* cited by examiner

*Primary Examiner*—Bing Q. Bui
(74) *Attorney, Agent, or Firm*—Morrison & Foerster LLP

(57) ABSTRACT

The invention relates to a method for signaling and processing incoming calls for a call center. The invention further relates to a corresponding exchange and corresponding call center. According to the invention, incoming calls for the call center and the subscriber numbers of the callers are signaled to the call center by the exchange via an internet protocol link between the exchange and the call center.

10 Claims, 1 Drawing Sheet

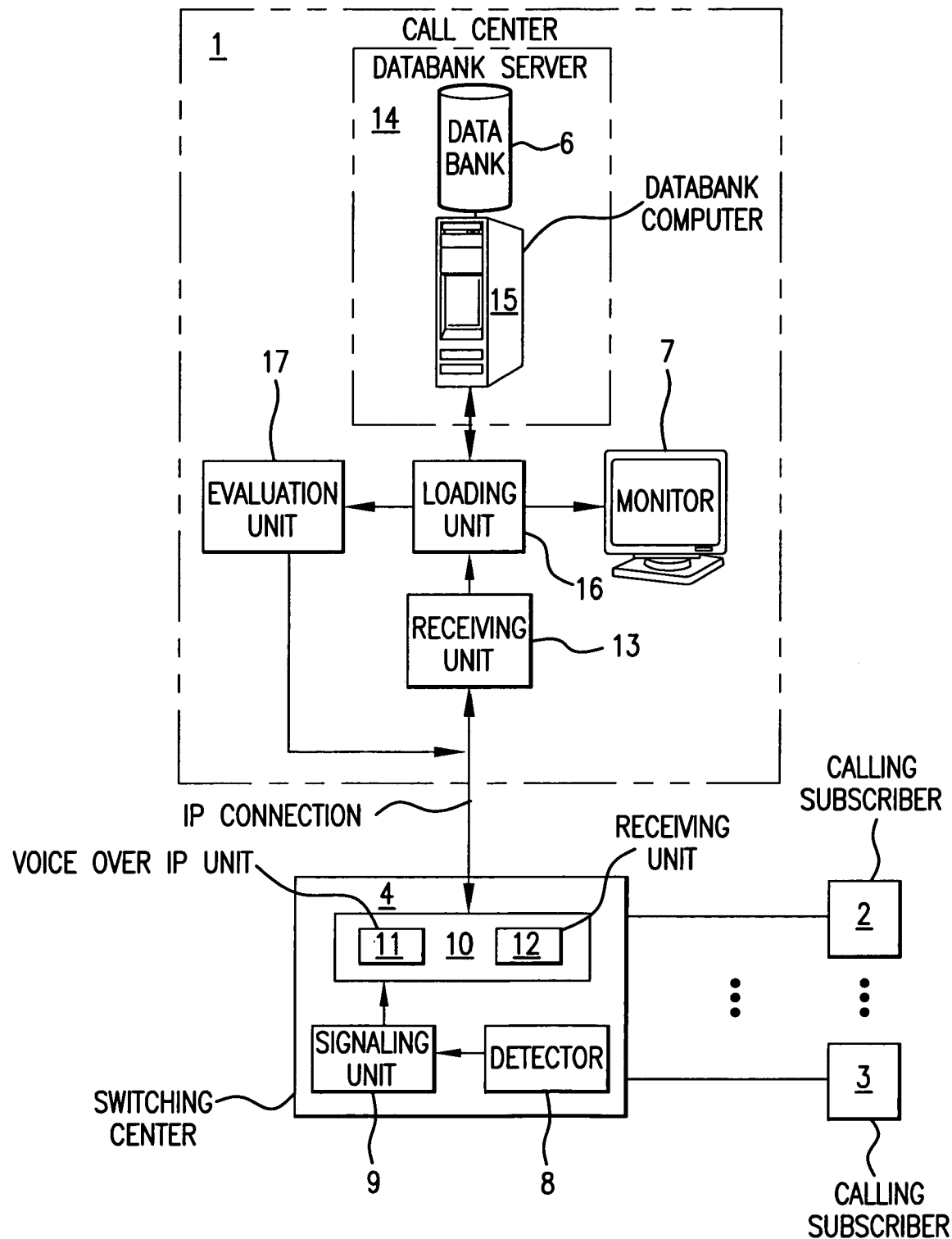

METHOD FOR SIGNALING AND PROCESSING INCOMING CALLS FOR A CALL CENTER

CLAIM FOR PRIORITY

This application claims priority to International Application No. PCT/EP00/12607 which was published in the German language on Jun. 21, 2001.

TECHNICAL FIELD OF THE INVENTION

The invention relates to a method for signaling and processing incoming calls for a call center and/or to a switching center.

BACKGROUND OF THE INVENTION

Call centers are used in particular for processing telephone requests, for example in administration centers, in insurance companies, in mail-oriented companies, and for home or direct banking. For this purpose, the call center has a group of employees, who are also referred to as agents and respond to the requests by telephone. For efficient processing of the telephone requests and answers, the agents are provided with appropriate technical equipment, such as PCs, via which they can access databanks with information, for example, about the caller.

One major aspect in a call center is the signaling of a telephone request or of an incoming call, as well as the subscriber access number or subscriber number of the caller. A further important aspect is the control of the signaled call, that is to say by way of example call acceptance and the setting up of a call connection, or else the passing on of calls to other agents with special knowledge if it is evident from the profile that that caller requires specialized advice.

Until now, incoming calls in call centers have been distributed by an automatic call distribution system (ACD) to the agents' telephones or PCs for processing. The distribution has been carried out either via the call center's own telephone network or via the public telephone network, when the agents are located at different points.

Calls and subscriber numbers may be signaled, by way of example, via the ISDN D channel. If the agent has a PC with CIT (Computer Integration Telephony), then the incoming call and the subscriber number may also be signaled, by way of example, directly on the PC monitor. The agent can then use the subscriber number to check a caller profile from a databank, via his PC. The setting up of a call connection or the passing on of the call to a specialist agent is carried out by the agent himself, by means of the signaling techniques of the public digital ISDN telephone network.

However, ISDN is used to widely differing extents in different countries: while ISDN is now widely used in Europe and, in particular, in Germany, ISDN is less widely used, by way of example, in the USA. In contrast, the Internet Protocol is becoming ever more widely used and may now even be used for the transmission of (telephone) call signals, for example using the voice over IP format.

SUMMARY OF THE INVENTION

In one embodiment of the invention, there is a method for signaling and for processing incoming calls for a call center, which may be used in conjunction with telecommunications networks using analog signaling techniques, and to provide a correspondingly configured switching center as well as a corresponding call center.

In one embodiment of the method according to the invention, linking of a call center to a switching center occurs via an Internet Protocol connection, e.g. via a connection via which data is transmitted using the Internet Protocol. The switching center receives calls for the call center together with the subscriber number of a calling subscriber. The received calls are detected by the switching center as calls for the call center, and are signaled via the Internet Protocol connection to the call center together with the subscriber number. The call center in turn controls the signaled calls through the Internet Protocol connection via the switching center in that, for example, requests to set up a call connection are transmitted to the switching center, or a call is passed on to another subscriber connection, for example to another call center with experts.

The switching center may use the EWSD (German abbreviation for Electronic Digital Dialing System) switching system from the Siemens Company, or some other digital switching center, but requires an Internet Protocol interface, such as the EWSD InterNode for transmission via the Internet Protocol connection.

With the method according to the invention, the signaling information about incoming calls for the call center is advantageously available in the Internet Protocol and can thus be processed further directly in an Internet session in the call center, in particular largely automatically. Another advantage of the invention is that the signaling and control between the call center and the switching center take place independently of the protocol of the telephone or telecommunications network to which the switching center and the call center are connected. There is thus no need for ISDN, in order to use the method. The call center can itself process the signaling information in the Internet Protocol, for example passing it on via a computer network within the call center to an agent's PC, or else can pass it on via an Internet Protocol connection between a number of call centers directly to a specific call center in which, for example, there are experts with particular technical know-how in order to answer calls from specific subscribers. This passing-on process can advantageously be carried out via the worldwide Internet, so that the signaling information can be passed on to a call center in a foreign country.

However, the signaled information, such as the incoming call and subscriber number is preferably not just passed on, for example, to an agent, but is also evaluated automatically, directly in the call center. For this purpose, a (caller) profile which is associated with the subscriber number of an incoming call for the call center is loaded from a databank in the call center. This profile can then be output directly via an output device, in particular a monitor, for example at an agent's workstation. There is thus no need for the agent to manually search through a databank for a profile for a subscriber number. Particularly since the signaling is based on the Internet Protocol, processing by means of a specific program on the PC is simple, for example in an Internet browser with an appropriate plug-in.

The profile may also be evaluated automatically directly in the call center, thus taking over control of the call with which that subscriber number is associated. By way of example, the subscriber numbers of a major customer who has both simple questions as well as difficult technical questions can be used, after evaluation in which the profile is used to find out whether a caller requires general information or detailed technical information, in the call center which is connected to the switching center for passing on calls to a call center with appropriate technical experts. In this case, this means that the call center which is communicating with the switching center via the Internet Protocol connection carries out a type of (intelligent) switching function.

Widely different applications are feasible on the basis of the entries in a profile, for example even passing on customers of a software company, who have different maintenance contracts including a technical hotline, being passed on to call centers with different services, depending on the contract. A call center in which no agent is available can likewise automatically pass on an incoming call via the switching center to another call center.

In still another embodiment, call connections can also be set up between subscriber connections and a call center via the Internet Protocol connection between the call center and the switching center. The calls are then preferably transmitted directly via the Internet Protocol connection from the switching center to the call center, and vice versa, using the voice over IP (VolP) format. This is worthwhile as an alternative to a call connection via the conventional public telephone network between a subscriber and a call center.

Since the call data is available in the Internet Protocol in the call center, it is possible to distribute call data as widely as required via further Internet Protocol connections, and to distribute it worldwide, at low cost. By way of example, a company which operates call centers in foreign countries could pass calls relating to difficult technical problems via the Internet to experts in a central call center. This involves very little cost for a customer of a Company, since he just needs to call the appropriate central call center in his own country, from where he is connected either via the Internet or via some other long-distance data connection to experts in the Company's central call center.

In switching centers which are based on the EWSD digital switching system from the Siemens Company, it is possible, by way of example, to provide additional plug-in cards which have appropriate means for carrying out the method, as electronic circuits. The corresponding situation applies, of course, to private automatic branch exchanges (PABX) which are used, for example, in large Companies. If such a private automatic branch exchange in a large Company has means for carrying out the method, a Company call center can be linked directly to this extension via a company-internal network. By way of example, the company-internal network may be an Intranet, via which data is transmitted using the Internet Protocol. Incoming calls for the Company which are directed to the call center are then passed on directly from the private automatic branch exchange via the company's own network to the call center.

The switching center preferably has a transmission unit for transmission of calls using the voice over IP (Internet Protocol) format. This makes it possible to signal not only incoming calls for the call center but also the corresponding subscriber numbers, while calls between subscribers and a call center are also transmitted via the Internet Protocol connection between the call center and the switching center.

Finally, in one preferred embodiment of the switching center, a receiving unit is provided for reception of control information, so that, in particular, it is possible to set up and clear calls between a subscriber and a call center from the call center via the Internet Protocol connection between the call center and the switching center. In this embodiment, by way of example, the acceptance of a call by an agent is not controlled via a conventional public telephone line between the call center and the switching center, but directly via the Internet Protocol connection, and this may be done conveniently, by way of example, by an agent's PC which is linked to the computer network at the call center.

A computer is preferably provided in the call center, which is connected via an Internet Protocol connection to a switching center and, via this connection, receives signaling for calls detected for the call center, and the associated subscriber numbers. At the same time, this computer will pass on the received subscriber numbers to the databank server, which in turn searches for an appropriate (caller) profile for that subscriber number from a databank, and loads this profile. The profile may be transmitted directly to an agent's PC, on whose monitor it is then output. If the profiles are evaluated automatically, the databank server will preferably pass on the loaded profiles to an evaluation computer, in which evaluation rules are stored, on the basis of which the profile is evaluated, with appropriate actions being initiated. The actions control, in particular, the setting up or clearing of call connections, or the passing on of calls between the call center and the subscriber connection.

In summary, a high degree of automation of the signaling and processing of incoming calls for the call center is achieved not only by the method according to the invention but also by a corresponding switching center and the corresponding call center.

BRIEF DESCRIPTION OF THE DRAWINGS

An exemplary embodiment of the invention will now be described in the following text, in conjunction with the FIGURE, in which:

FIG. 1 illustrates subscriber connections connected to a switching center via the public telephone network.

DETAILED DESCRIPTION OF THE INVENTION

A large number of subscriber connections 2, 3 are connected to a switching center 4 via the public telephone network (PSTN: Public Switched Telephone Network). The subscriber connections 2 and 3 are analog connections, for which, in the case of outgoing calls from the subscriber connections, the subscriber number, e.g. the telephone number associated with that subscriber connection, is transmitted to the switching center 4.

The switching center 4 is connected to a call center 1 via an Internet Protocol connection 5. The switching center 4 has a detector 8 for detection of incoming calls for the call center 1. In the one embodiment, the detector 8 compares the destination number transmitted from the calling subscriber connection with the telephone number associated with the call center 1 and, if the destination number corresponds to the telephone number of the call center 1, passes on the subscriber number of the calling subscriber connection to a signaling unit 9. The signaling unit 9 in turn transmits the subscriber number to an IP (Internet Protocol) transmission unit 10, to which it signals an incoming call for the call center 1. The IP transmission unit 10 "packs" the transmitted subscriber number and the signaling for an incoming call into the Internet Protocol, and transmits the corresponding data via the Internet Protocol connection 5 to the call center 1.

The call center 1 receives the data in the Internet Protocol in a receiving unit 13 for signaling, which receiving unit 13 uses the received data in the Internet Protocol to decode the subscriber number and signaling for an incoming call. The receiving unit 13 then transmits the subscriber number to a search and loading unit 16, which uses the transmitted subscriber number to generate a search instruction for a databank server 14, and transmits this instruction to this databank server 14.

The databank server 14 has a databank computer 15, and a databank 6 connected to it. The databank computer 15 now uses the received search instruction to search the databank 6 for any profile which may be present relating to that subscriber number, that is to say for a data record. If a data record or a profile is found, the databank computer 15 transmits this data record or profile to the search and loading unit 16, which in turn displays the data record or the profile on a monitor 7 at an agent's workstation in the call center. In parallel with this, the search and loading unit 16 transmits the data record or the profile to an evaluation unit 17, in which rules for evaluation of profiles are stored. The evaluation unit 17 then uses the stored rules and the received profile or data record to determine control information relating to the setting up of a connection or the passing on of the corresponding call for the call center 1. The determined control information is "packed" by the evaluation unit 17 into the Internet Protocol, and is transmitted via the Internet Protocol connection 5 to the IP transmission unit 10 in the switching center 4.

The control information is evaluated by means of a receiving unit 12 for control information in the IP transmission unit 10, and is further processed by the switching center 4. The control information may relate, in particular, to the setting up of a call connection between the calling subscriber connection and an agent in the call center 1. For this purpose, the call connection may be set up via the Internet Protocol connection 5 between the switching center 4 and the call center 1.

The IP transmission unit 10 has a voice over IP unit 11, which converts call signals to the voice over IP format for transmission via the Internet Protocol connection 5. The call signals in the voice over IP format are then passed on, in the call center 1, directly via the Internet to the agent's workstation. At the agent's workstation, the received data in the voice over IP format must be converted back to call signals, in order to make it possible to reproduce them via a loudspeaker. Conversely, the agent's speech must be converted via a microphone into electrical signals, which are in turn converted to the voice over IP format and are transmitted via the Internet and the Internet Protocol connection 5 from the call center 1 to the switching center 4. In the switching center 4, the voice over IP unit 11 converts the received data to call signals for transmission via the public telephone network to the calling subscriber connection. At the agent's workstation, apparatuses are provided for conversion of the voice over IP data to call signals for reproduction via a loudspeaker and, in the opposite direction, apparatuses are provided for conversion of the electrical call signals, which are supplied from a microphone, to voice over IP data. This may be either an Internet telephone, which is suitable for Internet telephony, or a PC with CIT functionality.

The embodiment of the invention is not restricted to the examples described above, and a large number of modified forms are likewise possible, which are within the scope of specialist knowledge. In particular, the invention need not be implemented exclusively via the Internet, but can be implemented in a general form on the basis of data networks with a suitable transmission protocol—in particular other IP networks.

The invention claimed is:

1. A method for signaling and processing incoming calls for a call center, comprising:
   receiving the incoming calls for the call center with a subscriber number of a calling subscriber from an ISDN switching center;
   detecting the calls as calls for the call center at the ISDN switching center; and
   signaling by the ISDN switching center using an IP protocol connection to signal to the call center the detected calls and the associated subscriber numbers,
   wherein the call center controls the signaled calls via the IP protocol connection through the ISDN switching center.

2. The method as claimed in claim 1, wherein a caller profile which is associated with the subscriber number is loaded from a databank in the call center on the basis of a signaled subscriber number, and the profile is output via an output device.

3. The method as claimed in claim 2, wherein a caller profile which is associated with one of the subscriber numbers is loaded from a databank in the call center on the basis of a signaled subscriber number, the caller profile is evaluated, and the call with which the subscriber number is associated is controlled as a function of the evaluation.

4. The method as claimed in claim 1, wherein a caller profile which is associated with one of the subscriber numbers is loaded from a databank in the call center on the basis of a signaled subscriber number, the caller profile is evaluated, and the call with which the subscriber number is associated is controlled as a function of the evaluation.

5. The method as claimed in claim 1, wherein a call connection is set up between the subscriber connection of the subscriber and the call center via the IP protocol connection between the call center and the switching center, and call signals are transmitted using the voice over IP format via the Internet Protocol connection.

6. An ISDN switching center for signaling of incoming calls for a call center, comprising:
   a detector to detect incoming calls for the call center;
   a signaling unit to signal the calls which are detected for the call center, and to signal the associated subscriber numbers; and
   a transmission unit to transmit the signaling via an IP protocol connection.

7. The switching center as claimed in claim 6, wherein the transmission unit provides for transmission of call signals using the voice over IP format via the IP protocol connection.

8. The switching center as claimed in claim 7, further comprising a receiving unit provided for reception of control information for signaled calls via the Internet Protocol connection.

9. The switching center as claimed in claim 6, further comprising a receiving unit provided for reception of control information for signaled calls via the Internet Protocol connection.

10. A call center, comprising:
    a receiving unit for reception of signaling of calls which are detected for the call center by an ISDN switching center and for signaling associated subscriber numbers;
    a databank server with a databank;
    a search and loading unit for searching and loading caller profiles from the databank;
    a display unit for displaying the caller profiles; and
    an evaluation unit for evaluation of the caller profiles and/or subscriber numbers, and for transmission of control signals for controlling signaled calls,
    wherein the signaling of calls utilizes an IP protocol connection.

* * * * *